(12) United States Patent  (10) Patent No.: US 9,407,788 B2
Horita  (45) Date of Patent: Aug. 2, 2016

(54) THRESHOLD VALUE DATA SETTING DEVICE, METHOD AND PROGRAM, AND IMAGE FORMING SYSTEM

(71) Applicant: FUJIFILM Corporation, Tokyo (JP)

(72) Inventor: Shuhei Horita, Tokyo (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/990,679

(22) Filed: Jan. 7, 2016

(65) Prior Publication Data

US 2016/0117576 A1  Apr. 28, 2016

Related U.S. Application Data

(63) Continuation of application No. PCT/JP2014/064694, filed on Jun. 3, 2014.

(30) Foreign Application Priority Data

Jul. 23, 2013 (JP) ................................. 2013-152904

(51) Int. Cl.
*H04N 1/405* (2006.01)
*G06K 15/02* (2006.01)
(Continued)

(52) U.S. Cl.
CPC .......... *H04N 1/4055* (2013.01); *G06K 15/1876* (2013.01); *G06K 15/1881* (2013.01); *B41C 1/00* (2013.01); *B41M 1/02* (2013.01); *B41M 1/04* (2013.01); *B41P 2200/12* (2013.01)

(58) Field of Classification Search
None
See application file for complete search history.

(56) References Cited

U.S. PATENT DOCUMENTS 5,557,709 A * 9/1996 Shu ...................... H04N 1/4051
                                                        358/1.9
5,760,920 A * 6/1998 Lin .......................... H04N 1/52
                                                        358/3.2
(Continued)

FOREIGN PATENT DOCUMENTS

JP  2002-368995 A  12/2002
JP  2004-064689 A   2/2004
(Continued)

OTHER PUBLICATIONS

International Search Report (ISR) (PCT Form PCT/ISA/210), in PCT/JP2014/064694, dated Jul. 15, 2014.
(Continued)

*Primary Examiner* — Scott A Rogers
(74) *Attorney, Agent, or Firm* — McGinn IP Law Group, PLLC

(57) ABSTRACT

Disclosed are a threshold value data setting device, method, and program and an image forming system capable of, even if the number of types of printing devices and printing materials is enormous, simply and easily determining threshold value data suitable for any combination thereof. A change in dot shape occurring in an image forming process from the creation of a binary image signal 46 to the formation of an image is acquired as response characteristics data 112 in a spatial frequency domain. The response characteristics data 112 is applied to create a simulated image signal in which the change in dot shape is reproduced in a simulated manner. Threshold value data 44 to be set is determined from among threshold value candidates by a comparison and/or evaluation based on quantitative values calculated by executing predetermined evaluation processing for the simulated image signal.

20 Claims, 17 Drawing Sheets

(51) Int. Cl.
*B41C 1/00* (2006.01)
*B41M 1/02* (2006.01)
*B41M 1/04* (2006.01)

(56) References Cited

U.S. PATENT DOCUMENTS

| | | | |
|---|---|---|---|
| 9,055,264 B2* | 6/2015 | Horita | H04N 1/52 |
| 9,083,921 B2* | 7/2015 | Horita | H04N 1/54 |
| 2012/0033277 A1 | 2/2012 | Fuse et al. | |

FOREIGN PATENT DOCUMENTS

| | | |
|---|---|---|
| JP | 2011-139364 A | 7/2011 |
| JP | 2011-239193 A | 11/2011 |
| JP | 2012-054761 A | 3/2012 |

OTHER PUBLICATIONS

Written Opinion of the International Searching Authority, dated Jul. 15, 2014 in PCT/JP2014/064694.
Extended European Search Report dated May 10, 2016.

* cited by examiner

FIG. 13

|  | AVERAGE VALUE OVER ALL GRADATION LEVELS | MAXIMUM VALUE |
|---|---|---|
| THRESHOLD VALUE CANDIDATE A | 16.7 | 45.5 |
| THRESHOLD VALUE CANDIDATE B | 24.1 | 60.7 |
| THRESHOLD VALUE CANDIDATE C | 23.8 | 56.1 |

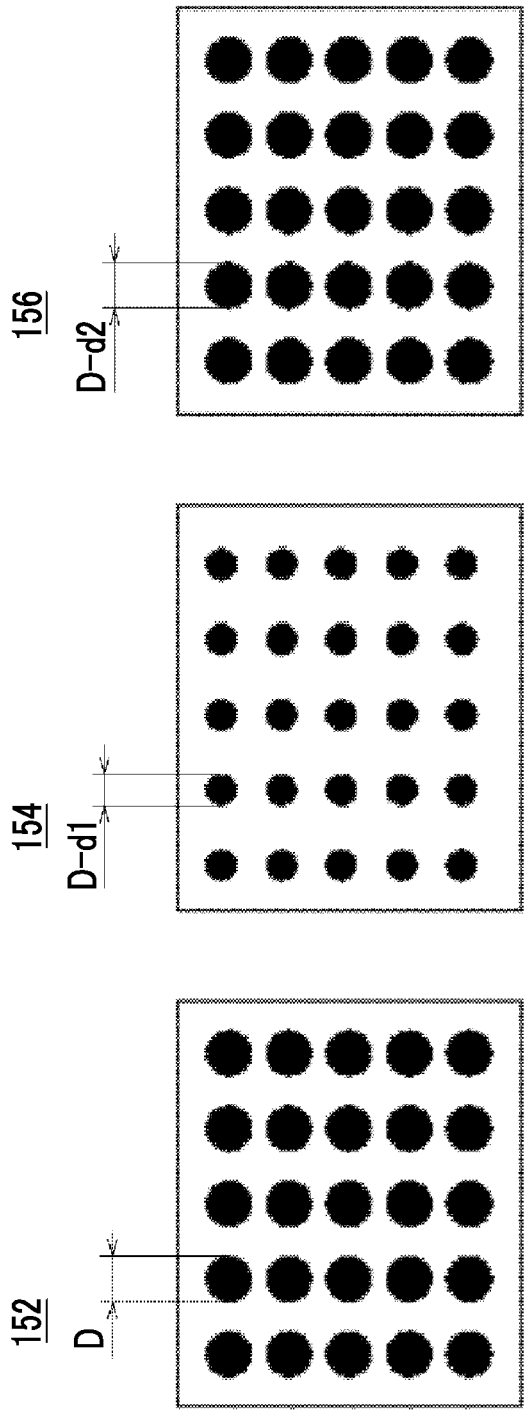

THRESHOLD VALUE DATA SETTING DEVICE, METHOD AND PROGRAM, AND IMAGE FORMING SYSTEM

CROSS-REFERENCE TO RELATED APPLICATIONS

This application is a Continuation of PCT International Application No. PCT/JP2014/064694 filed on Jun. 3, 2014, which claims priority under 35 U.S.C §119(a) to Patent Application No. 2013-152904 filed in Japan on Jul. 23, 2013, all of which are hereby expressly incorporated by reference into the present application.

BACKGROUND OF THE INVENTION

1. Field of the Invention

The present invention relates to a threshold value data setting device, method, and program, and an image forming system which set threshold value data for creating a binary image signal representing the shape and arrangement of respective dots constituting an image based on a continuous tone image signal.

2. Description of the Related Art

In a printing field, computer to plate (CTP) which directly forms a printing plate through electronic data without generating an intermediate product is becoming widespread. Typically, in a process of forming a printing plate, screening processing including a systematic dither method is executed for a continuous tone image signal. Various methods of determining threshold value data in consideration of all or a part of the characteristics of a printing system in order to obtain high-image quality printed matter have been hitherto suggested.

JP2002-368995A suggests a method which determines a threshold value array causing hardly any occurrence of moire by sequentially performing (1) pseudo generation of dots and (2) evaluation of a specific frequency component of a density pattern including the dots.

SUMMARY OF THE INVENTION

In recent years, there has come to be a variety of kinds of usable printing devices or printing materials (coloring materials, printing mediums, printing plates, or the like). For example, as the kinds of printing devices, there are a gravure printing machine, a flexographic printing machine, a digital printing machine (on-demand printing machine), and the like, as well as an offset printing machine. As the kinds of the printing mediums, there are resins, such as vinyl chloride and polyethylene terephthalate (PET), tarpaulin, metal sheets, and the like, as well as paper, such as synthetic paper, thick paper, and aluminized paper.

On the other hand, in general, it is known that printing characteristics change according to combinations of printing devices and printing materials to be used. For example, in offset printing and flexographic printing, since the kinds of printing plates (in particular, elastic characteristics) are different, the degree of change in dot gain tends to be different. In the case of digital printing machine requiring no printing plate, it is not necessary to consider a change in image quality due to the formation of the printing plate.

However, according to the method described in JP2002-368995A, since it is assumed that threshold value data suitable for each combination of printing devices and printing materials is created, many steps are required for preparation and creation processing, and there is room for improvement.

The invention has been accomplished in order to solve the above-described problems, and an object of the invention is to provide a threshold value data setting device, method, and program, and an image forming system capable of, even if the number of printing devices and printing materials is enormous, simply and easily determining threshold value data suitable for any combination thereof.

A threshold value data setting device according to the invention which sets threshold value data for creating a binary image signal representing the shape and arrangement of respective pixels constituting an image based on a continuous tone image signal includes a threshold value candidate acquisition unit which acquires dot information relating to the shape and arrangement of the respective dots linked to the continuous tone image signal and acquires a plurality of pieces of threshold value data matching the dot information as respective threshold value candidates, a response characteristics acquisition unit which acquires a change in dot shape occurring in an image forming process from the creation of the binary image signal to the formation of the image as response characteristics in a spatial frequency domain, a simulated image creation unit which applies the response characteristics acquired by the response characteristics acquisition unit to create a simulated image signal in which the change in dot shape is reproduced in a simulated manner, a quantitative value calculation unit which calculates an evaluation value obtained by executing predetermined evaluation processing for the simulated image signal created by the simulated image creation unit as a quantitative value indicating the degree of image quality, and a threshold value data determination unit which applies the respective threshold value candidates acquired by the threshold value candidate acquisition unit and determines threshold value data to be set from among the respective threshold value candidates by a comparison and/or evaluation based on the quantitative values calculated by the quantitative value calculation unit.

In this way, the change in dot shape occurring in the image forming process from the creation of the binary image signal to the formation of the image is acquired as the response characteristic in the spatial frequency domain, and the response characteristics are applied to create the simulated image signal in which the change in dot shape is reproduced in a simulated manner; thus, it is possible to reproduce a dot shape on a simulated image simply and with excellent accuracy. A plurality of pieces of threshold value data acquired as the respective threshold value candidates are compared and/or evaluated based on the quantitative values representing the degree of image quality; thus, even if the number of printing devices and printing materials is enormous, it is possible to simply and easily determine threshold value data suitable for any combination thereof.

It is preferable that the simulated image creation unit creates the simulated image signal including at least one screen tint region, and the quantitative value calculation unit calculates the quantitative values based on a principal component excluding components corresponding to the respective dots for a power spectrum in the screen tint region of the simulated image signal.

It is preferable that the simulated image creation unit creates the simulated image signal including two or more screen tint regions with different gradation levels, and the quantitative value calculation unit calculates the quantitative values based on statistics about the principal component in the respective screen tint regions.

It is preferable that the threshold value data setting device further includes a response characteristics estimation unit which estimates the response characteristics according to an event causing a change to the dot shape in the image forming process, and the response characteristics acquisition unit acquires the response characteristics estimated by the response characteristics estimation unit.

It is preferable that the response characteristics estimation unit estimates the response characteristics for transferring a coloring material to a printing material through a printing plate.

It is preferable that the response characteristics estimation unit estimates the response characteristics for forming the printing plate by engraving a principal surface of a plate material.

It is preferable that the threshold value data setting device further includes a binarization processing unit which converts the continuous tone image signal to the binary image signal by setting the threshold value data determined by the threshold value data determination unit.

An image forming system according to the invention includes the above-described threshold value data setting device, and an image forming device which forms the image based on the binary image signal converted by the threshold value data setting device.

A threshold value data setting method according to the invention which sets threshold value data for creating a binary image signal representing the shape and arrangement of respective pixels constituting an image based on a continuous tone image signal causes a computer to execute a step of acquiring dot information relating to the shape and arrangement of the respective dots linked to the continuous tone image signal and acquiring a plurality of pieces of threshold value data matching the dot information as respective threshold value candidates, a step of acquiring a change in dot shape occurring in an image forming process from the creation of the binary image signal to the formation of the image as response characteristics in a spatial frequency domain, a step of applying the response characteristics acquired by the response characteristics acquisition unit to create a simulated image signal in which the change in dot shape is reproduced in a simulated manner, a step of calculating an evaluation value obtained by executing predetermined evaluation processing for the simulated image signal created by the simulated image creation unit as a quantitative value indicating the degree of image quality, and a step of applying the respective acquired threshold value candidates and determining threshold value data to be set from among the respective threshold value candidates by a comparison and/or evaluation based on the calculated quantitative values.

A threshold value data setting program according to the invention which sets threshold value data for creating a binary image signal representing the shape and arrangement of respective pixels constituting an image based on a continuous tone image signal causes a computer to execute a step of acquiring dot information relating to the shape and arrangement of the respective dots linked to the continuous tone image signal and acquiring a plurality of pieces of threshold value data matching the dot information as respective threshold value candidates, a step of acquiring a change in dot shape occurring in an image forming process from the creation of the binary image signal to the formation of the image as response characteristics in a spatial frequency domain, a step of applying the response characteristics acquired by the response characteristics acquisition unit to create a simulated image signal in which the change in dot shape is reproduced in a simulated manner, a step of calculating an evaluation value obtained by executing predetermined evaluation processing for the simulated image signal created by the simulated image creation unit as a quantitative value indicating the degree of image quality, and a step of applying the respective acquired threshold value candidates and determining threshold value data to be set from among the respective threshold value candidates by a comparison and/or evaluation based on the calculated quantitative values.

According to the threshold value data setting device, method, and program, and the image forming system of the invention, the change in dot shape occurring in the image forming process from the creation of the binary image signal to the formation of the image is acquired as the response characteristics in the spatial frequency domain, and the response characteristics are applied to create the simulated image signal in which the change in dot shape is reproduced in a simulated manner; thus, it is possible to reproduce a dot shape on a simulated image simply and with excellent accuracy. A plurality of pieces of threshold value data acquired as the respective threshold value candidates are compared and/or evaluated based on the quantitative values representing the degree of image quality; thus, even if the number of printing devices and printing materials is enormous, it is possible to simply and easily determine threshold value data suitable for any combination thereof.

BRIEF DESCRIPTION OF THE DRAWINGS

FIG. 13 is a table showing quantitative results for respective threshold value candidates.

FIG. 15A is a schematic front view visualizing sample image dots. FIG. 15B is a front view of a sample letterpress formed based on the sample image dots of FIG. 15A.

FIG. 15C is a front view of sample printed matter formed based on the sample letterpress of FIG. 15B.

DESCRIPTION OF THE PREFERRED EMBODIMENTS

Hereinafter, a threshold value data setting method according to the invention will be described in detail referring to the accompanying drawings while giving a preferred embodiment in relation to a threshold value data setting device and program and an image forming system for carrying out the threshold value data setting method. In this specification, image formation may be called "printing" or "character printing".

[Overall Configuration of Image Forming System 10]

Figure 1:
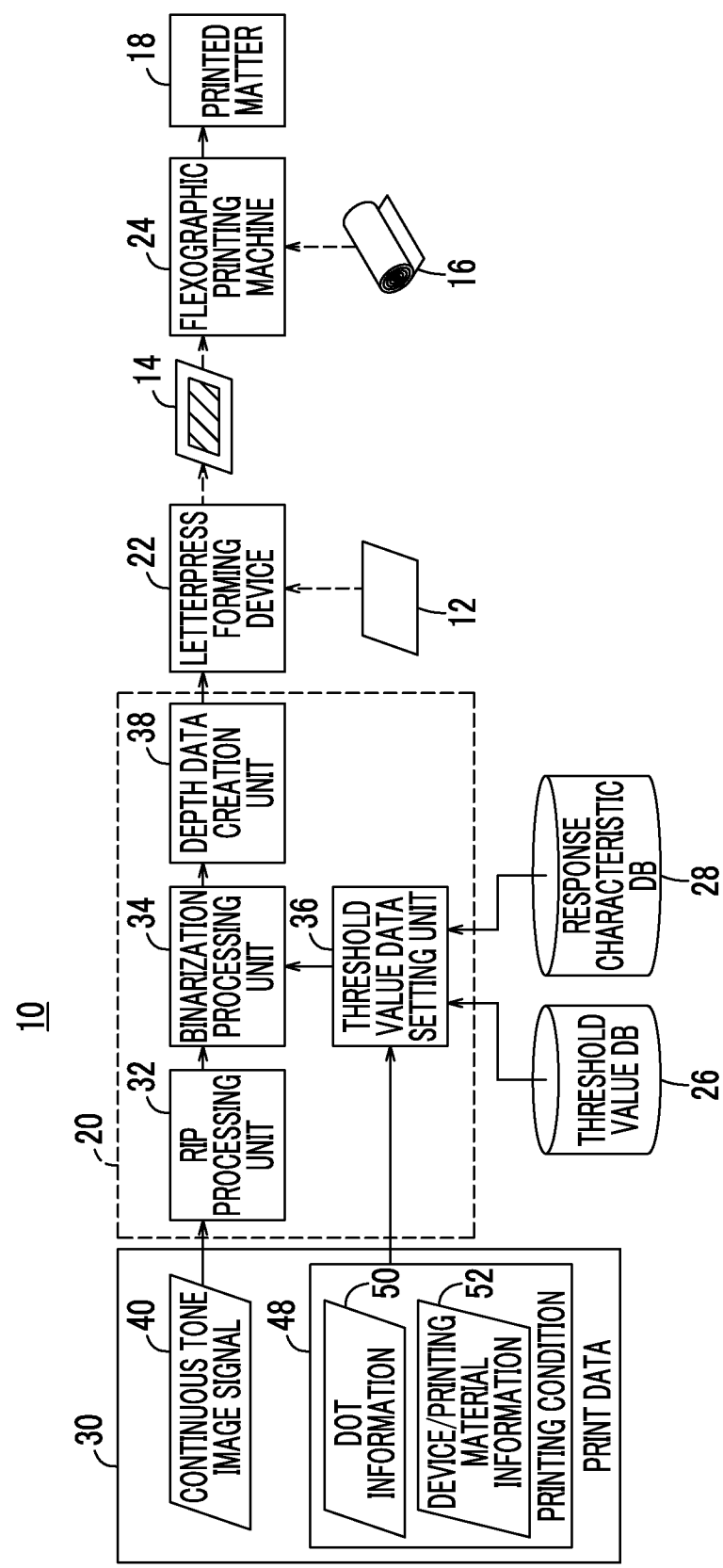
FIG. 1 is an overall configuration diagram of an image forming system of this embodiment.

FIG. 1 is an overall configuration diagram of an image forming system 10 according to this embodiment. The image forming system 10 is a system which engraves a flat plate-shaped plate material 12 to form a letterpress 14 (printing plate) and transfers ink (coloring material) to a printing medium 16 through the letterpress 14 to produce printed matter 18. The printed matter 18 has dots of at least one color formed on the printing medium 16.

The image forming system 10 basically includes an image processing device 20 as a threshold value data setting device, letterpress forming device 22, a flexographic printing machine 24, a threshold value database (hereinafter, referred to as a threshold value DB 26), and a response characteristics database (hereinafter, referred to as a response characteristics DB 28). In this embodiment, the letterpress forming device 22 and the flexographic printing machine 24 constitute an image forming device which forms an image on the printing medium 16.

The image processing device 20 creates depth data representing a three-dimensional shape on a principal surface of the letterpress 14 based on input print data 30 and sends the data to the letterpress forming device 22 side. In more detail, the image processing device 20 includes a raster image processor (RIP) processing unit 32, a binarization processing unit 34, a threshold value data setting unit 36, and a depth data creation unit 38.

The RIP processing unit 32 subjects a continuous tone image signal 40 expressed in page description language (PDL) to rasterization processing to convert the continuous tone image signal 40 to an image signal (hereinafter, referred to as a raster image signal 42) in a raster format.

The binarization processing unit 34 subjects the raster image signal 42 to screening processing to convert the raster image signal 42 to an image signal (hereinafter, referred to as a binary image signal 46) having two values. The binary image signal 46 represents the shape and arrangement of respective dots constituting an image. In this embodiment, as a screening processing method, a systematic dither method using threshold value data 44 is used.

Figure 2:
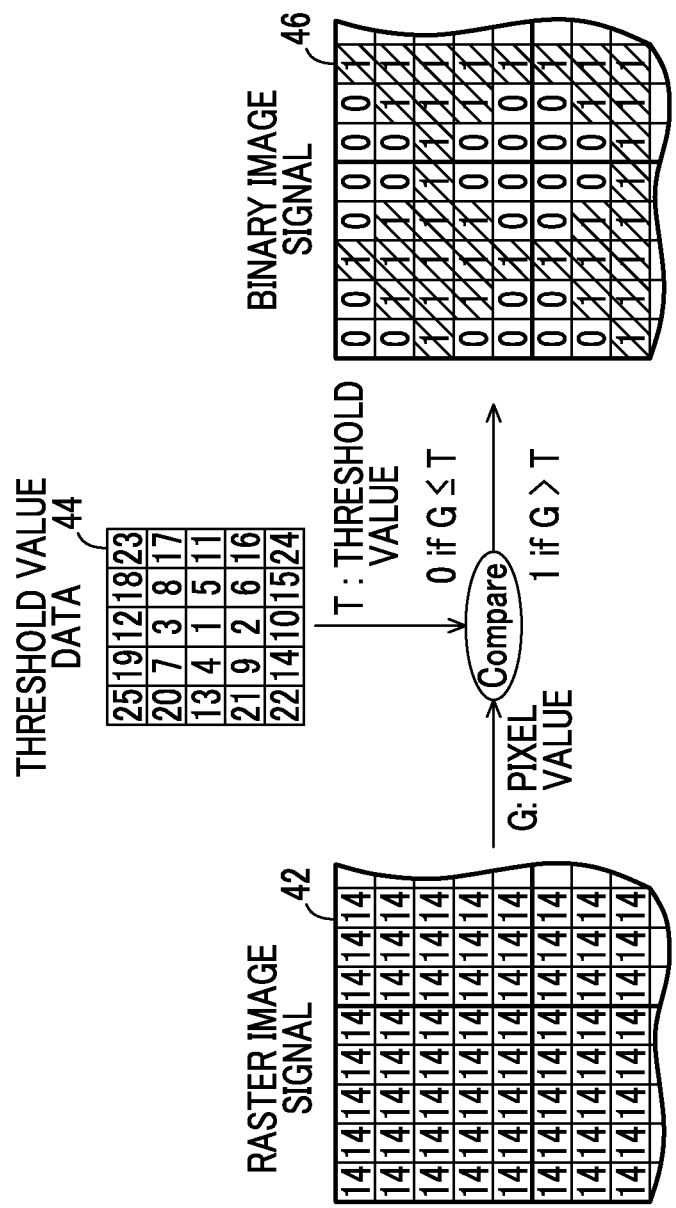
FIG. 2 is a schematic explanatory view relating to the operation of a binarization processing unit shown in FIG. 1.

FIG. 2 is a schematic explanatory view relating to the operation of the binarization processing unit 34 shown in FIG. 1. This drawing shows the concept of binarization using threshold value data 44 (threshold value matrix). First, each matrix element of threshold value data 44 is associated with each address of the raster image signal 42. The binarization processing unit 34 compares the magnitude relationship between a pixel value G in a target pixel and a threshold value T in a corresponding matrix element. When G>T is satisfied, "1 (ON)" is allocated, and otherwise (G≤T), "0 (OFF)" is allocated. In this way, the raster image signal 42 having "26" gradation levels is converted to the binary image signal 46 having "2" gradation levels. In the example of this drawing, a cluster (AM dots) of 13 "ON" hatched pixels is formed in each square region having 25 pixels as a unit.

Returning to FIG. 1, prior to the above-described screening processing, the threshold value data setting unit 36 acquires threshold value data 44 suitable for print data 30 from the threshold value DB 26 and supplies threshold value data 44 to the binarization processing unit 34 side. The print data 30 includes various conditions (hereinafter, referred to as printing conditions 48) relating to the formation of the printed matter 18, in addition to the continuous tone image signal 40. The printing conditions 48 are constituted of information (hereinafter, referred to as dot information 50) relating to the shape and arrangement of the dots and information (hereinafter, referred to as device/printing material information 52) relating to the devices or printing materials of the image forming system 10.

Figure 3:
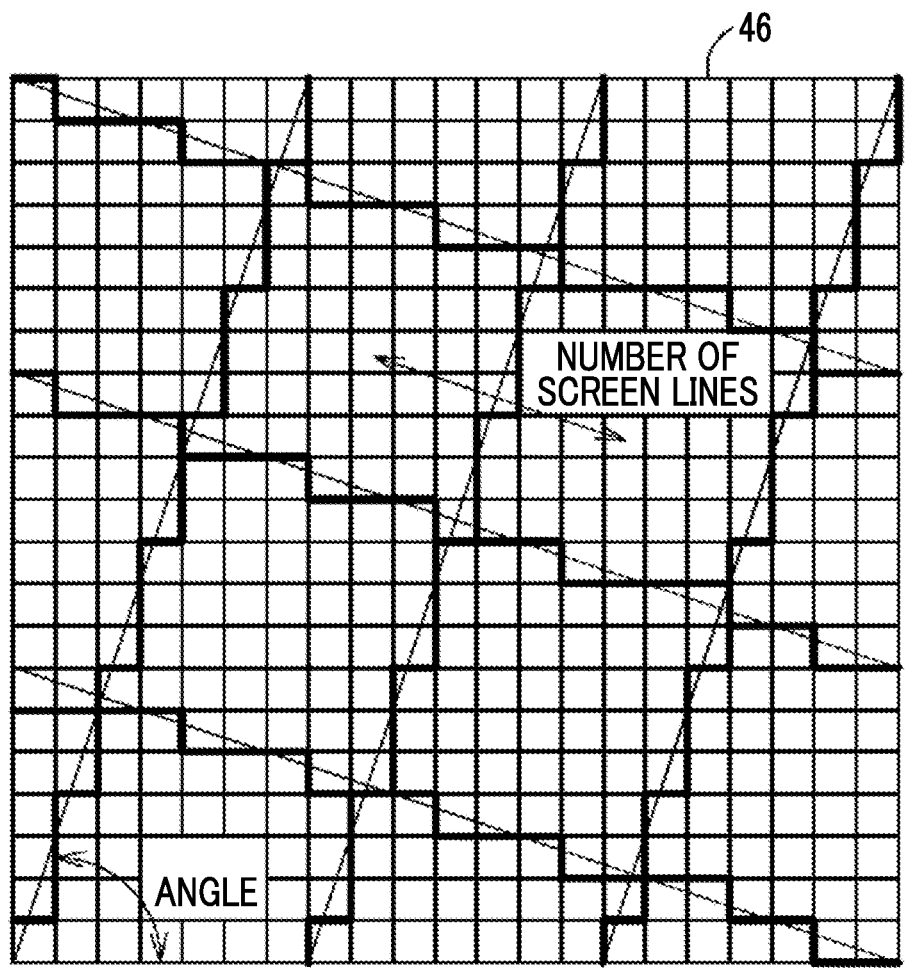
FIG. 3 is an explanatory view of respective parameters relating to dot information.

FIG. 3 is an explanatory view of respective parameters relating to the dot information 50. The "number of screen lines" is the density of dots per unit length, and line per inch (LPI) is generally used as a unit. A "screen angle" is the angle between the array direction of the dots and a vertical axis (or a horizontal axis), and a degree is generally used as a unit.

Returning to FIG. 1, the depth data creation unit 38 creates depth data corresponding to a two-dimensional distribution of an engraving amount of the plate material 12 based on the binary image signal 46 acquired from the binarization processing unit 34. The value or range of depth data can be arbitrarily defined according to the letterpress forming device 22. The value or range of depth data may be defined as the height of the plate material 12 from a reference surface, instead of the engraving amount.

[Schematic Configuration of Letterpress Forming Device 22]

The letterpress forming device 22 is a CTP (Computer To Plate) drawing device which engraves the principal surface of the plate material 12 based on depth data supplied from the image processing device 20 to form the letterpress 14 including a plurality of dot protrusions (not shown). In the case of flexographic printing, as the plate material 12, high elastic materials including a rubber sheet, a photocurable resin sheet, and the like are used.

Figure 4:
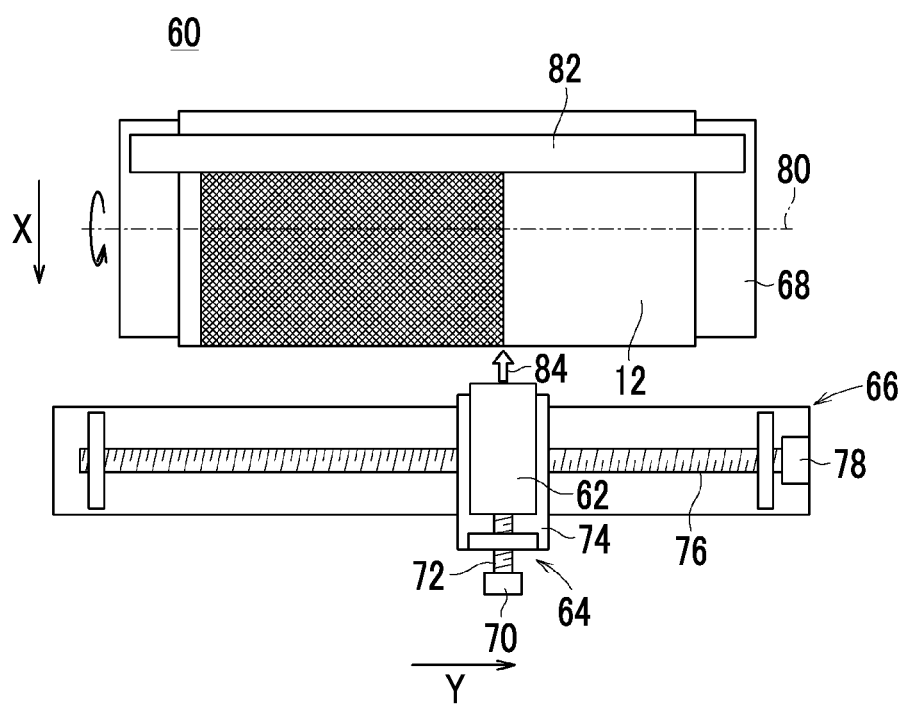
FIG. 4 is a schematic configuration diagram of a laser engraving machine constituting a letterpress forming device shown in FIG. 1.

FIG. 4 is a schematic configuration diagram of a laser engraving machine 60 constituting the letterpress forming device 22 of FIG. 1. The laser engraving machine 60 includes an exposure head 62, a focus position changing mechanism 64, and an intermittent feeding mechanism 66 in an arrow Y direction (sub scanning direction).

The focus position changing mechanism 64 has a motor 70 and a ball screw 72 which move the exposure head 62 backward and forward with respect to a drum 68 with the plate material 12 attached thereto. The focus position changing mechanism 64 moves the focus position by the control of the motor 70.

The intermittent feeding mechanism 66 has a ball screw 76 and a sub scanning motor 78 which rotates the ball screw 76. The intermittent feeding mechanism 66 moves a stage 74 with the exposure head 62 mounted thereon in the arrow Y direction by the control of the sub scanning motor 78. With this, the exposure head 62 is intermittently fed in a direction of an axis 80 of the drum 68.

The plate material 12 is chucked by a chuck member 82 on the drum 68. The position of the chuck member 82 is set in a region where exposure by the exposure head 62 is not performed. In this case, a laser beam 84 is radiated from the exposure head 62 toward the plate material 12 on the drum 68 while rotating the drum 68 around the axis 80, whereby the principal surface of the plate material 12 is laser-engraved.

With the rotation of the drum 68, when the chuck member 82 passes in front of the exposure head 62, intermittent feeding is performed in the arrow Y direction, whereby laser engraving for the next line is performed.

The feeding of the plate material 12 in an arrow X direction (main scanning direction) by the rotation of the drum 68 and the intermittent feeding of the exposure head 62 in the arrow Y direction (sub scanning direction) are repeated successively, whereby the position of exposure scanning is controlled. The on/off or emission intensity of the laser beam 84 is controlled based on depth data (that is, the engraving amount) at each position supplied from the image processing device 20 (FIG. 1) in synchronization with this control. As a result, a relief (including a dot protrusion) having a desired shape is formed on the principal surface (plate surface) of the plate material 12.

In this way, the letterpress forming device 22 forms the letterpress 14 for printing for each color plate. The letterpress 14 is mounted in the flexographic printing machine 24.

[Schematic Configuration of Flexographic Printing Machine 24]

The flexographic printing machine 24 is a printing device which is able to form the printed matter 18 by transferring ink to the plate surface of the printing medium 16 through the letterpress 14 formed by the letterpress forming device 22. In the case of flexographic printing, as the printing medium 16, not only flat paper or rolled paper for printing, but also a printing medium whose surface has a great uneven shape, for example, corrugated paper, a film, cloth, or the like can be used.

Figure 5:
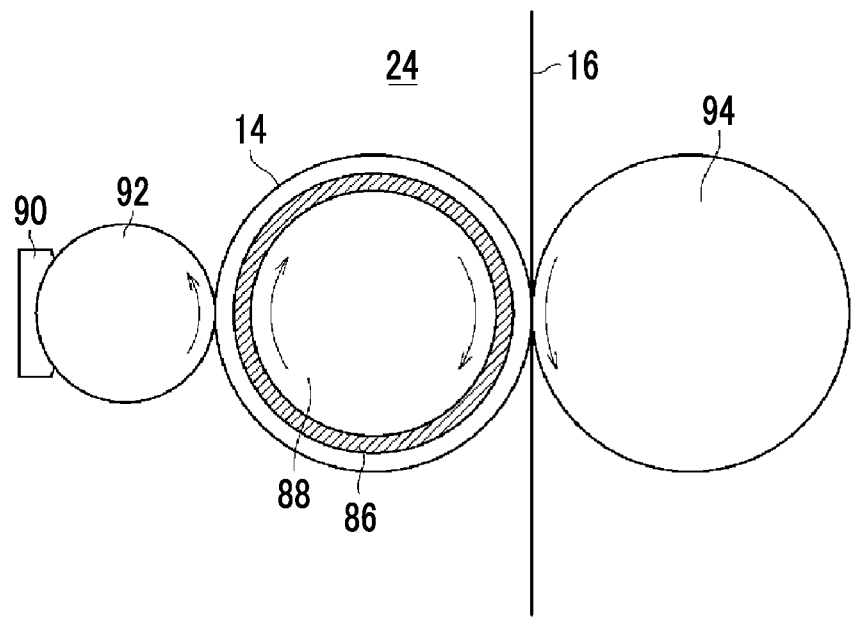
FIG. 5 is a schematic configuration diagram of a flexographic printing machine shown in FIG. 1.

FIG. 5 is a schematic configuration diagram of the flexographic printing machine 24 shown in FIG. 1. The flexographic printing machine 24 is constituted of the above-described letterpress 14, a plate cylinder 88 to which the letterpress 14 is attached through a cushion tape 86, an anilox roller 92 to which ink is supplied by a doctor chamber 90, and an impression cylinder 94 which pressurizes the printing medium 16.

Ink supplied from the doctor chamber 90 is transferred in the order of the anilox roller 92 and the letterpress 14 (the top surface of the dot protrusion). In addition, the printing medium 16 is transported in a state of being sandwiched between the plate cylinder 88 and the impression cylinder 94. That is, ink transferred to the letterpress 14 is further transferred to the printing medium 16, whereby an image constituted of many dots is formed on the printing medium 16.

[Electrical Block Diagram of Image Processing Device 20]

Figure 6:
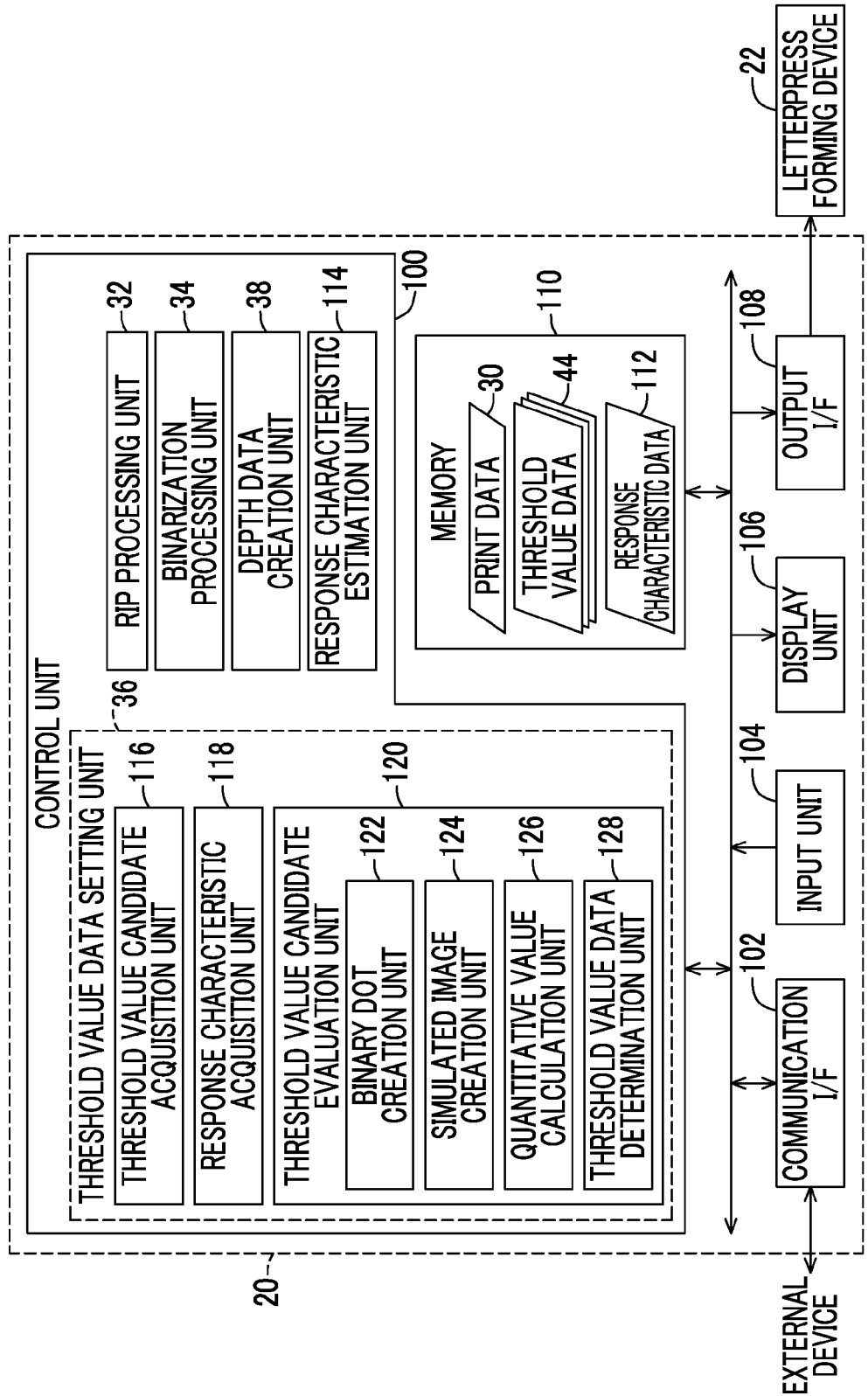
FIG. 6 is an electrical block diagram of an image processing device shown in FIG. 1.

FIG. 6 is an electrical block diagram of the image processing device 20 shown in FIG. 1. The image processing device 20 is a computer including a control unit 100, a communication I/F 102, an input unit 104, a display unit 106, an output I/F 108, and a memory 110 (storage medium).

The communication I/F 102 is an interface (I/F) which transmits and receives an electrical signal to and from an external device. With this, the image processing device 20 is able to acquire various pieces of data including print data 30 from the external device.

The input unit 104 is constituted of various input devices, such as a mouse, a trackball, a keyboard, and a touch panel. The display unit 106 displays an image according to a display control signal through a control circuit (not shown). A user interface is realized by combining an input function of the input unit 104 and a display function of the display unit 106.

The output I/F 108 is an interface (I/F) which transmits depth data as an electrical signal to the letterpress forming device 22.

The memory 110 stores programs, data, and the like necessary when the control unit 100 controls the respective constituent elements. In the example of this drawing, print data 30, a plurality of kinds of threshold value data 44, and response characteristics data 112 described below are stored.

The memory 110 may be constituted of a non-transitory computer-readable storage medium. Here, the computer-readable storage medium is a portable medium, such as a magneto-optical disk, a ROM, a CD-ROM, or a flash memory, or a storage device, such as a hard disk built into a computer system. The storage medium may store a program dynamically for a short period of time or may store a program for a given time.

Figure 14:
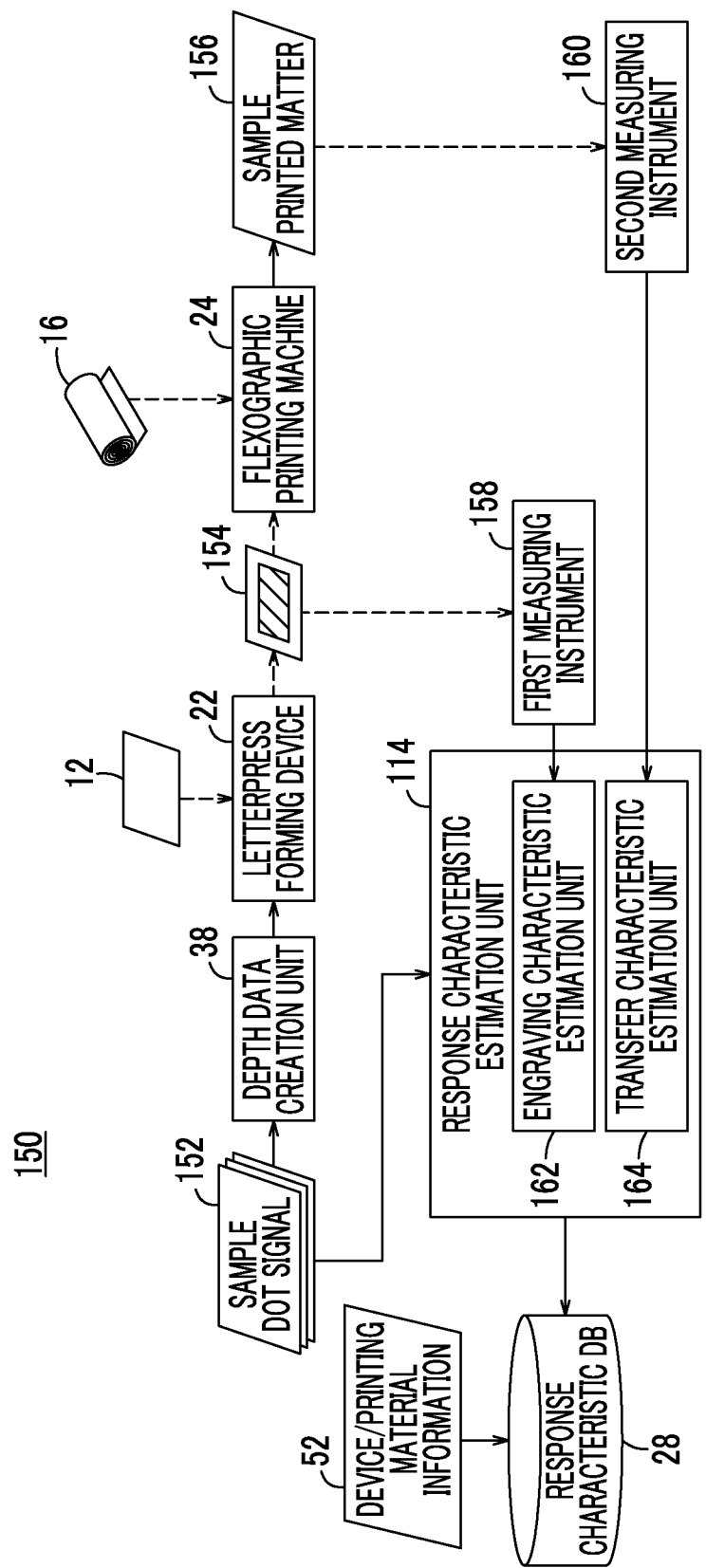
FIG. 14 is an overall configuration diagram of a response characteristics estimation system.

The control unit 100 is constituted of a processor, such as a central processing unit (CPU). The control unit 100 reads and executes the program stored in the memory 110, thereby realizing the respective functions of the RIP processing unit 32, the binarization processing unit 34, the threshold value data setting unit 36, the depth data creation unit 38 (FIG. 1), and the response characteristics estimation unit 114 (FIG. 14).

The threshold value data setting unit 36 includes a threshold value candidate acquisition unit 116 which acquires threshold value data 44 (hereinafter, referred to as threshold value candidates) as a setting target candidate, a response characteristics acquisition unit 118 which acquires spatial frequency response characteristics (hereinafter, simply referred to as "response characteristics") representing a change in dot shape, and a threshold value candidate evaluation unit 120 which quantitatively evaluates reproducibility of the dot shape for each threshold value candidate.

The threshold value candidate evaluation unit 120 includes a binary point creation unit 122, a simulated image creation unit 124, a quantitative value calculation unit 126, and a threshold value data determination unit 128. The functions of the respective units will be described below.

[Operation of Image Processing Device 20]

Figure 7:
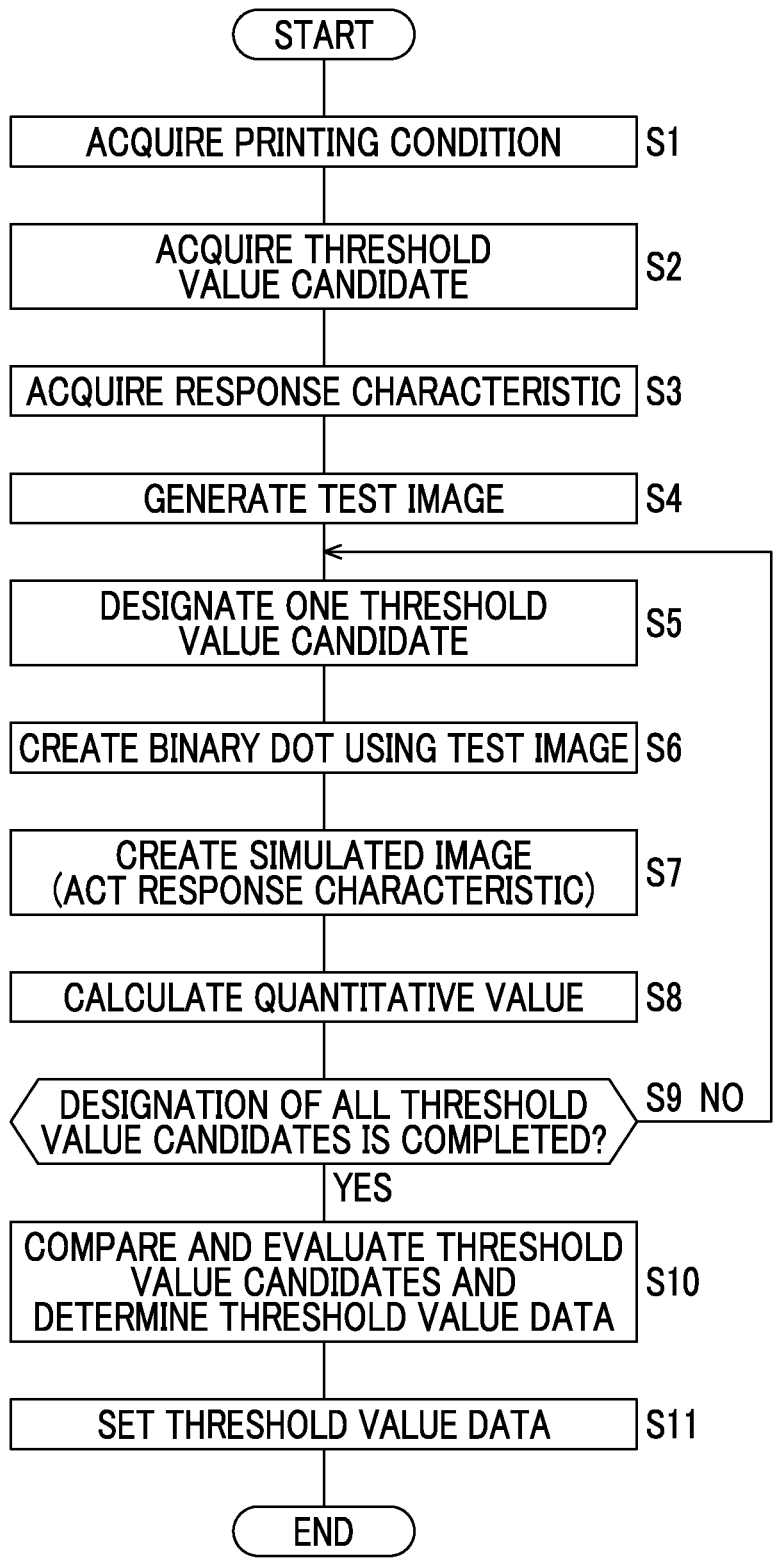
FIG. 7 is a flowchart for operation description of the image processing device shown in FIGS. 1 and 6.

The image processing device 20 as a dot data setting device according to this embodiment is configured as above. Subsequently, the operation of the image processing device 20 (primarily, the threshold value data setting unit 36) shown in FIGS. 1 and 6 will be described in detail primarily referring to the flowchart of FIG. 7.

In Step S1, the threshold value data setting unit 36 acquires the printing conditions 48 linked to the continuous tone image signal 40. As shown in FIG. 1, the printing conditions 48 include the dot information 50 and the device/printing material information 52.

As the dot information 50, for example, the number of screen lines, the screen angle, a target dot shape (circle, ellipse, rectangle, and a combination thereof), and screen characteristics (AM screen or FM screen) are considered. As the device/printing material information 52, for example, the device configuration of the image forming system 10, and the type of the printing medium 16, the plate material 12, the coloring material, and the constituent components of the device (for example, the exposure head 62 of FIG. 4) are considered.

In Step S2, the threshold value candidate acquisition unit 116 acquires threshold value data 44 (hereinafter, referred to as threshold value candidates) partially matching the printing conditions 48 obtained in Step S1. Prior to this acquisition, the threshold value DB 26 executes search processing on the database according to a request from the image processing device 20 and supplies threshold value data 44 conforming to the dot information 50 to the image processing device 20 side. Thereafter, the threshold value candidate acquisition unit 116 reads and acquires all threshold value candidates temporarily stored in the memory 110. Here, it is assumed that three threshold value candidates A, B, and C are acquired.

In Step S3, the response characteristics acquisition unit 118 acquires response characteristics data 112 partially matching the printing conditions 48 obtained in Step S1. Prior to this acquisition, the response characteristics DB 28 executes search processing on the database according to a request from the image processing device 20 and supplies response characteristics data 112 conforming to the device/printing material information 52 to the image processing device 20 side. Thereafter, the response characteristics acquisition unit 118 reads and acquires response characteristics data 112 temporarily stored in the memory 110.

It should be noted that the response characteristics data 112 is data representing a change in dot shape occurring in an image forming process from the creation of the binary image signal 46 (FIG. 2) to the formation of the image and depends on the configuration of the image forming system 10. In the example of FIG. 1, the response characteristics acquisition unit 118 acquires, as the response characteristics data 112, "engraving response characteristics" corresponding to the optical characteristics of the laser engraving machine 60 (FIG. 4) and "transfer response characteristics" corresponding to the transfer characteristics of the flexographic printing machine 24 (FIG. 5).

Figure 8A:
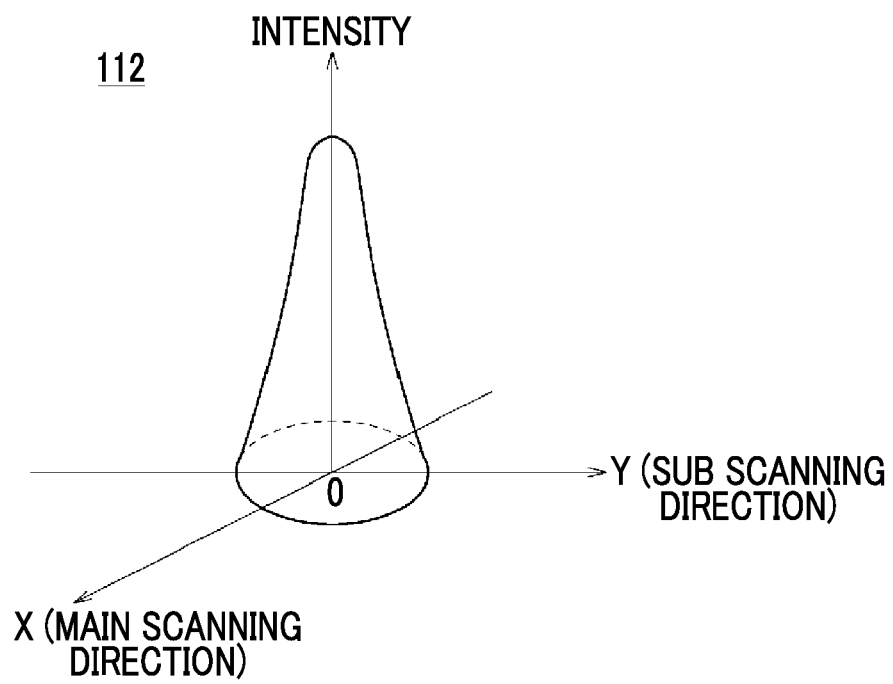
FIGS. 8A and 8B are graphs showing an example of engraving response characteristics.
Figure 8B:
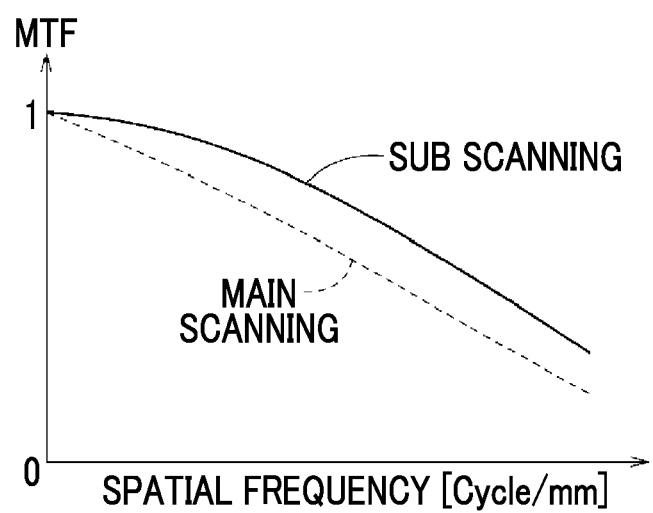

FIGS. 8A and 8B are graphs showing an example of engraving response characteristics. Specifically, FIG. 8A is a point image distribution function {hereinafter, referred to as point spread function (PSF)}, and FIG. 8B corresponds to a sectional view of a Fourier transform function of the PSF shown in FIG. 8A. In these graphs, the X axis and the Y axis respectively correspond to the arrow X direction and the arrow Y direction shown in FIG. 4.

As shown in FIG. 8A, the PSF is a function of a schematically conical shape with the origin O as a peak. The PSF is a delta function in an ideal system; however, in an actual system, the point image spreads due to various optical factors. The degree of spread in the X-axis direction depends on the effective beam diameter in the arrow X direction of the laser beam 84 (FIG. 4), the rotation speed of the drum 68 (the same drawing), the rising and/or falling characteristics of the laser beam source (not shown), and the like. The degree of spread in the Y-axis direction depends on the effective beam diameter of the laser beam 84 in the arrow Y direction, exposure multiplicity of the laser beam 84, and the like.

A modulation transfer function (MTF) shown in FIG. 8B corresponds to sine wave response characteristics of each spatial frequency. As will be understood from this drawing, when the spatial frequency becomes high, the MTF gradually become small. An MTF of "sub scanning" indicated by a solid line tends to become higher than "main scanning" indicated by a broken line.

In Step S4, the threshold value candidate evaluation unit 120 creates a test image signal for quantitative evaluation of each threshold value candidate. As the test image signal, an arbitrary raster image signal 42 may be used, and in this case, an image signal including at least one screen tint region (halftone solid region) is created.

In Step S5, the threshold value candidate evaluation unit 120 designates one threshold value candidate not yet evaluated among a plurality of threshold value candidates (three threshold value candidates A to C) acquired in Step S2. Hereinafter, the threshold value candidate designated is called a "designated threshold value candidate".

In Step S6, the binary point creation unit 122 subjects each test image signal generated in Step S4 to screening processing using the designated threshold value candidate to create a binary dot signal of each gradation level.

Figure 9:
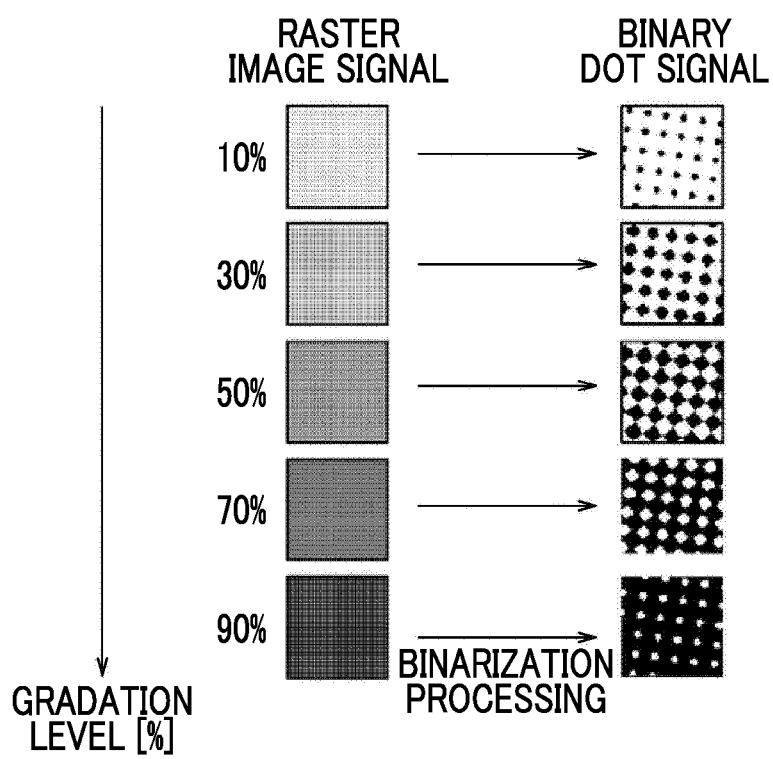
FIG. 9 is an explanatory view showing a result of binarization processing for each test image signal.

FIG. 9 is an explanatory view showing a result of subjecting a test image signal to binarization processing. In the example of this drawing, a binary dot signal representing five screen tint images with different shades is created from a test image signal including five screen tint regions having a gradation level of 10%, 30%, 50%, 70%, and 90%.

In Step S7, the simulated image creation unit 124 creates, from the binary dot signal created in Step S6, a simulated image signal in which the dot shape on the printed matter 18 is reproduced in a simulated manner.

Figure 10:
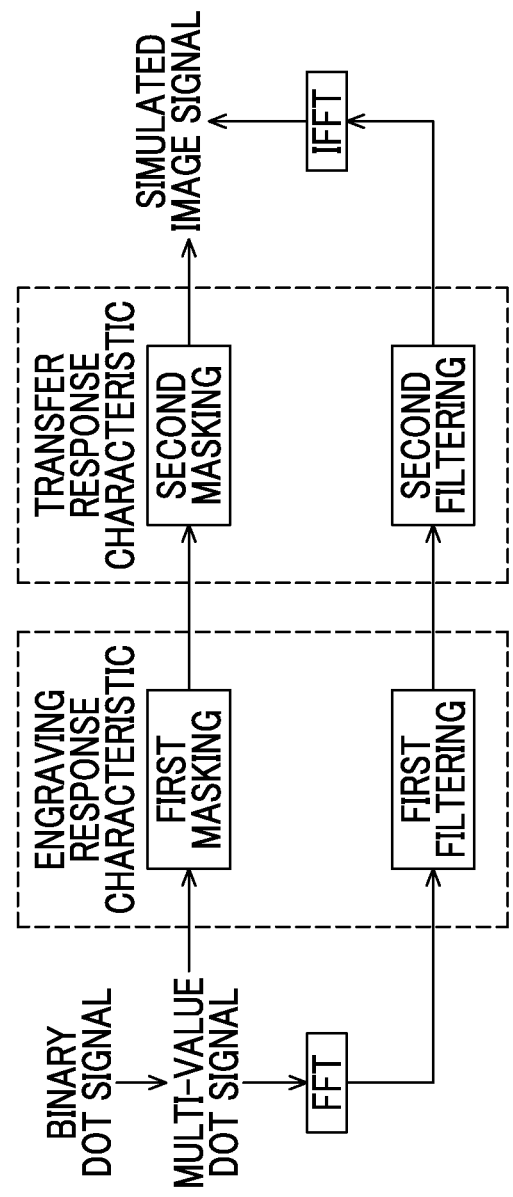
FIG. 10 is a schematic explanatory view relating to the operation of a simulated image creation unit shown in FIG. 6.

FIG. 10 is a schematic explanatory view relating to the operation of the simulated image creation unit 124 shown in FIG. 6. This drawing schematically shows a process until a simulated image signal is created from a binary dot signal.

First, the simulated image creation unit 124 converts a binary dot signal indicating the on or off state of each pixel to a multi-value dot signal corresponding to the height distribution of the letterpress 14. Thereafter, the simulated image creation unit 124 subjects the obtained multi-value dot signal to processing for applying the response characteristics in the spatial frequency domain. In the processing for applying the response characteristics, masking, filtering, or a combination thereof can be applied. The reason for this is that a calculation result on a Euclidean space or a Fourier space is substantially equivalent due to the nature of Fourier transform mapping.

Here, "masking" means image processing for executing a mask operation (convolution) on the Euclidean space to modulate a spatial frequency component (spectrum intensity) of an image. Furthermore, "filtering" means image processing for executing a filter operation (multiplication) on the Fourier space to modulate a spatial frequency component (spectrum intensity) of an image signal.

According to the processing flow shown on the upper side of this drawing, the simulated image creation unit 124 sequentially performs first masking using a mask indicating engraving response characteristics and second masking using a mask indicating transfer response characteristics to create a simulated image signal. Furthermore, according to the processing flow shown on the lower side of this drawing, the simulated image creation unit 124 sequentially performs first filtering using a filter indicating engraving response characteristics and second filtering using a filter indicating transfer response characteristics to create a simulated image signal. Here, it should be noted that fast Fourier transform (FFT) is performed before the execution of the filtering, and inverse fast Fourier transform (IFFT) is performed after the execution of the filtering.

In Step S8, the quantitative value calculation unit 126 calculates an evaluation value obtained by subjecting the simulated image signal created in Step S7 to predetermined evaluation processing as a quantitative value indicating the degree of image quality. In this embodiment, in order to calculate the quantitative value, the power spectrum of the simulated image signal is used. For example, in order to increase the degree of correlation with visibility, preprocessing for multiplying the power spectrum by the standard human visual response characteristics may be performed.

Figure 11:
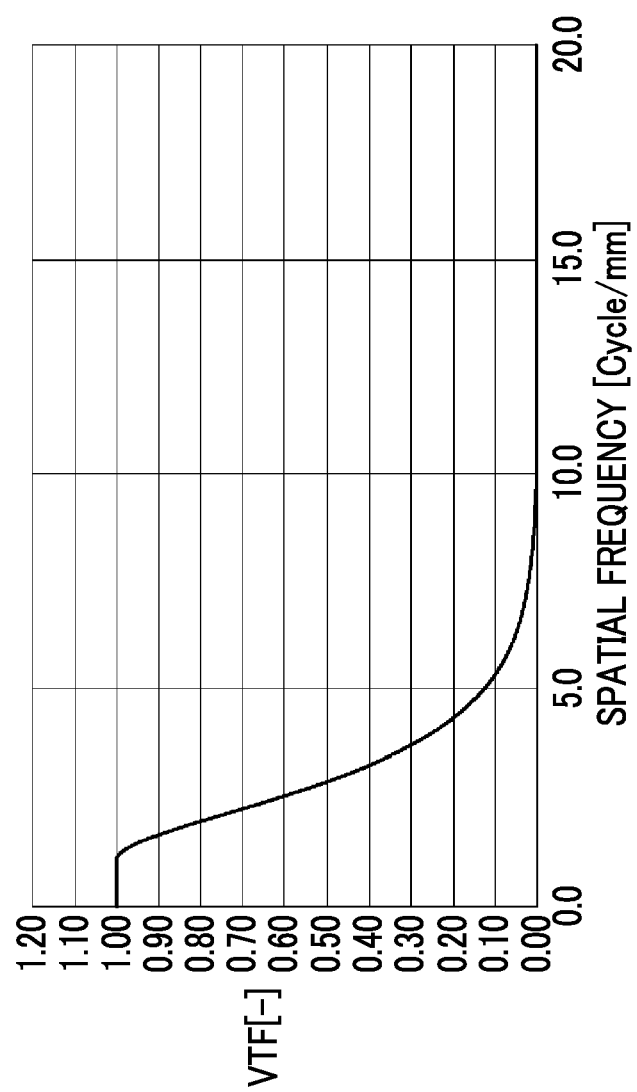
FIG. 11 is a graph of a Dooley-Shaw function having an observation distance of 300 mm.

FIG. 11 is a graph of a Dooley-Shaw function having an observation distance of 300 mm. This function is a kind of visual transfer function (VTF), and is a representative function simulating the standard human visual response characteristics. Specifically, this function corresponds to a square value of contrast ratio characteristics of luminance. The horizontal axis of the graph represents a spatial frequency (unit: Cycle/mm), and the vertical axis represents a value of a VTF (the unit is dimensionless).

The function shape of the VTF is not limited thereto, and various characteristics derived from mathematical models, experimental data, and the like may be applied. The observation distance may not only correspond to 300 mm but also may be changed in various ways according to an observation mode of an image, criteria for evaluation, or the like.

In order to appropriately reflect a visual correction effect by the preprocessing described above, the pixel value of the simulated image signal may be converted to an amount having a high correlation (preferably, linear) to the amount of light reflected by or transmitted through an image. As an example, an RGB value, a tri-stimulus value (XYZ), light reflectance in the case of a reflection original, light transmittance in the case of a transmission original, or the like may be used.

Figure 12A:
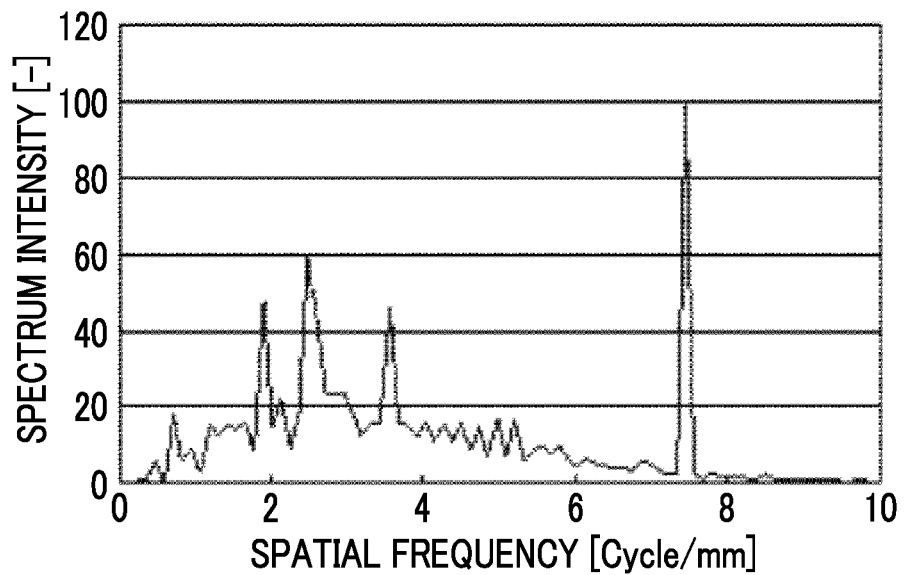
FIG. 12A is a graph showing an example of a power spectrum in a simulated image signal.

FIG. 12A is a graph showing an example of a power spectrum in a simulated image signal. The horizontal axis of the graph represents a spatial frequency (unit: Cycle/mm), and the vertical axis of the graph represents spectrum intensity (the unit is arbitrary; hereinafter, simply referred to as "component"). The power spectrum shown in this drawing has four peaks at the positions where the spatial frequency is about 1.9, about 2.4, about 3.6, and about 7.4 Cycle/mm. The quantitative value calculation unit 126 extracts the maximum value (corresponding to a principal component; hereinafter, referred to as maximum intensity) of the spectrum intensity after excluding a component (in this case, a component around about 7.4 Cycle/mm) corresponding to each dot. In this case, the quantitative value calculation unit 126 extracts "60", which is a peak maximum value at about 2.4 Cycle/mm, as maximum intensity. When the value of the maximum intensity is greater, the degree of image quality is evaluated to be lower, and when the value is smaller, the degree of image quality is evaluated to be higher. The quantitative value is a value which is quantitatively or qualitatively correlated with image quality of the printed matter 18. The reason for this is that a component other than a component corresponding to each dot contributes to image noise including color irregularity, moire, granularity, or the like.

The graph of the example of this drawing corresponds to a power spectrum of a simulated image signal created from a test image signal having a gradation level of 70% using the threshold value candidate B. The quantitative value calculation unit 126 extracts the maximum intensity with respect to the simulated image signal of each gradation level including the case of 70%.

Thereafter, the quantitative value calculation unit 126 calculates the quantitative value of the designated threshold value candidate based on the maximum intensity of each gradation level obtained in the above-described manner. Here, the quantitative value calculation unit 126 calculates an average value or a maximum value over all gradation levels as the "quantitative value". The calculation expression of the quantitative value is not limited thereto, and various quantitative values may be calculated based on statistics of maximum intensity in each screen tint region or a combination thereof (for example, a weighted sum of an average value and a maximum value). The evaluation processing for the simulated image signal is not limited to the above-described method, and various known image evaluation methods including granularity {RMS (Root Mean Square) or the like}, sharpness (MTF or the like), or gradation (gradation smoothness or the like), needless to say, can be applied.

In Step S9, the threshold value candidate evaluation unit 120 determines whether or not the designation of all threshold value candidates is completed. When it is determined that the designation of all threshold value candidates is not completed (Step S9: NO), the process returns to Step S5. Hereinafter, Steps S5 to S8 are sequentially repeated. When it is determined that the designation of all threshold value candidates is completed (Step S9: YES), the process progresses to the nest step (S10).

In Step S10, the threshold value data determination unit 128 determines one piece of threshold value data 44 by performing a comparison and/or evaluation of the threshold value candidates.

Figure 12B:
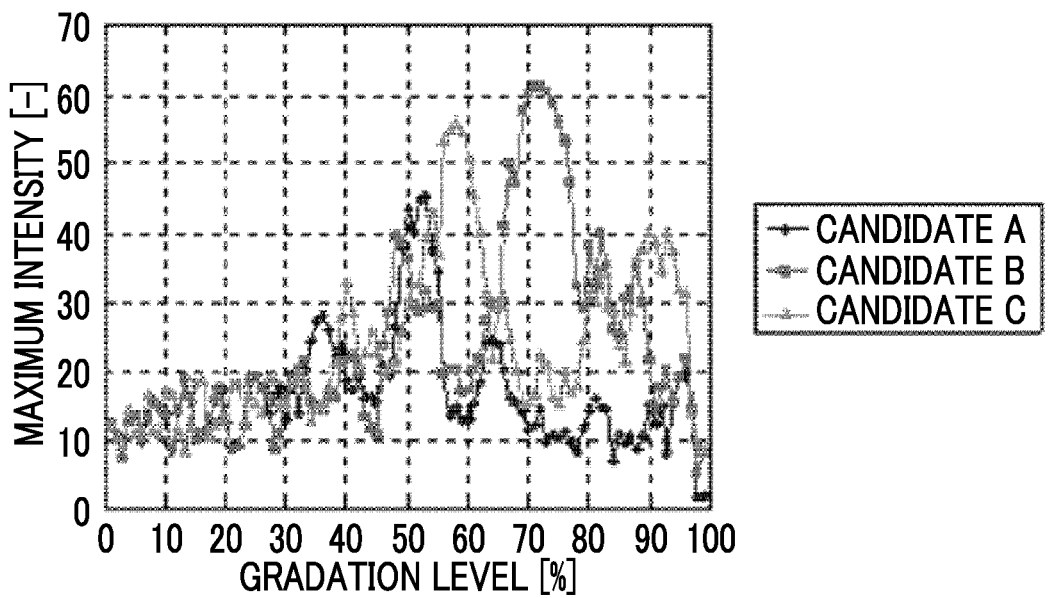
FIG. 12B is a graph showing peak characteristics of a power spectrum in each threshold value candidate.

FIG. 12B is a graph showing maximum intensity of each gradation level in each of the threshold value candidates A to C. FIG. 13 is a table showing a calculation result of a quantitative value for each of the threshold value candidates A to C. The threshold value candidate evaluation unit 120 determines the threshold value candidate A having the smallest "average value" or "maximum value" as threshold value data 44 based on the evaluation result shown in FIG. 13.

In Step S11, the threshold value data setting unit 36 performs setting for associating threshold value data 44 determined in Step S10 with print data 30. With this, it is possible to automatically set threshold value data 44 suitable for the image forming system 10 for creating depth data from print data 30. In this way, the operation of the image processing device 20 (primarily, the threshold value data setting unit 36) is completed.

[Configuration and Operation of Response Characteristic Estimation System 150]

Subsequently, the configuration and operation of a response characteristics estimation system 150 in which the response characteristics estimation unit 114 (FIG. 6) is incorporated will be described referring to FIGS. 14 to 17B.

FIG. 14 is an overall configuration diagram of the response characteristics estimation system 150. The response characteristics estimation system 150 is a system which sequentially forms a sample letterpress 154 and sample printed matter 156 based on a sample dot signal 152 and estimates response characteristics in the whole or a part of the image forming system 10 using measurement results of a first measuring instrument 158 and a second measuring instrument 160.

The sample dot signal 152 is a binary image signal representing the shape and arrangement of respective dots constituting an arbitrary image. Here, in order to facilitate estimation processing described below, the sample dot signal 152 may be the same signal as the binary dot signal (FIG. 9).

The depth data creation unit 38 creates depth data corresponding to a two-dimensional distribution of an engraving amount of the plate material 12 based on the input sample dot signal 152. Then, the letterpress forming device 22 forms the sample letterpress 154 including a plurality of dot protrusions (not shown) by engraving the principal surface of the plate material 12 based on depth data supplied from the depth data creation unit 38. Then, the flexographic printing machine 24 forms the sample printed matter 156 by transferring ink to the plate surface of the printing medium 16 through the sample letterpress 154 formed by the letterpress forming device 22.

The first measuring instrument 158 is a device which optically reads an uneven shape of the sample letterpress 154, and can measure a dot area ratio on the sample letterpress 154. The second measuring instrument 160 is a device which optically reads the color characteristics of the sample printed matter 156, and can measure a dot area ratio on the sample printed matter 156.

The response characteristics estimation unit 114 estimates response characteristics according to an event causing a change in dot shape in the image forming process. As the event causing a change in dot shape, one or two or more events according to a recording system of the image forming device may be considered. Here, the response characteristics estimation unit 114 estimates "engraving response characteristics" for forming the letterpress 14 by engraving the principal surface of the plate material 12 and "transfer response characteristics" for transferring ink to the printing medium 16 through the letterpress 14.

The response characteristics estimation unit 114 includes an engraving characteristic estimation unit 162 which estimates the engraving response characteristics based on the dot area ratio on the sample letterpress 154 measured by the first measuring instrument 158, and a transfer characteristic estimation unit 164 which estimates the transfer response characteristics based on the dot area ratio on the sample printed matter 156 measured by the second measuring instrument 160.

Hereinafter, an estimation method of the engraving characteristic estimation unit 162 will be described in detail referring to FIGS. 15A to 16B.

FIG. 15A is a schematic front view visualizing the sample dot signal 152 shown in FIG. 14. Here, a painted region in FIG. 15A and FIGS. 15B and 15C described below indicates a region contributing to determining each dot shape. In the example of this drawing, it is assumed that each dot has a circular shape and the diameter thereof is D (known value).

FIG. 15B is a schematic front view of the sample letterpress 154 formed based on the sample dot signal 152 of FIG. 15A. With the application of the response characteristics shown in FIGS. 8A and 8B, the dot area ratio on the sample letterpress 154 becomes smaller than a design value of the dot area ratio. As a result, an average diameter corresponding to the measured dot area ratio is (D−d1).

FIG. 15C is a schematic front view of the sample printed matter 156 formed based on the sample letterpress 154 of FIG. 15B. When a high elastic material is used as the plate material 12, a dot gain for transferring ink tends to be increased. At this time, the dot area ratio on the sample printed matter 156 becomes greater than the dot area ratio on the sample letterpress 154. As a result, an average diameter corresponding to the measured dot area ratio is (D−d2) (however, d2<d1).

Here, a method which estimates the height shape of the dot protrusion from the measured dot area ratio and estimates the engraving response characteristics based on the change of the height shape can be applied. Hereinafter, a specific method will be described referring to FIGS. 16A to 17B.

Figure 16A:
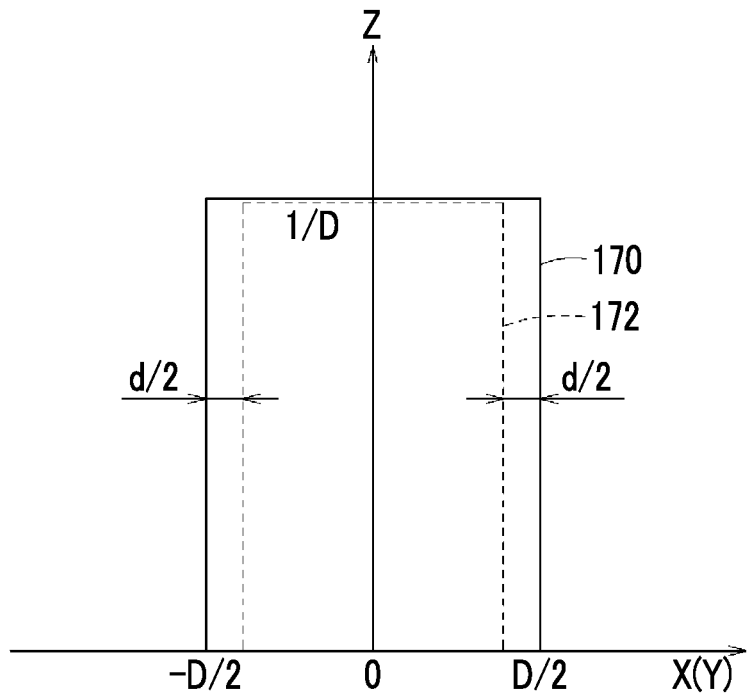
FIG. 16A is a first explanatory view relating to an estimation model of a height shape of a dot protrusion.

FIG. 16A is a first explanatory view relating to an estimation model of a height shape of a dot protrusion. The horizontal axis of the graph represents the position in the X-axis (or Y-axis) direction, and the vertical axis of the graph represents the position in the Z-axis (height) direction. A solid line of this drawing indicates an ideal height shape (hereinafter, an ideal dot shape 170) of each dot protrusion in the sample dot signal 152. A broken line of this drawing indicates an ideal height shape (hereinafter, referred to as a virtual dot shape 172) of each dot protrusion in the sample letterpress 154. This estimation model is constructed on an assumption that the height of the dot protrusion is always constant, and primarily simulates a phenomenon of a dot gain.

Figure 16B:
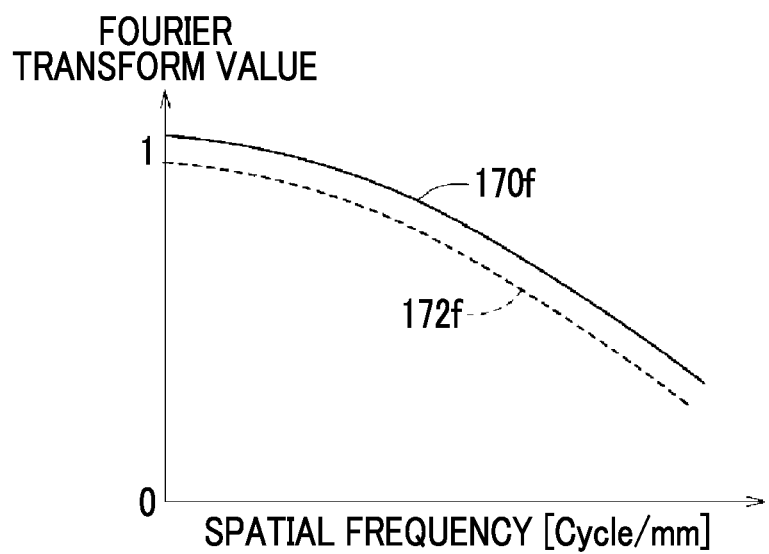
FIG. 16B is a graph showing Fourier transform characteristics of the height shape shown in FIG. 16A.

FIG. 16B is a graph showing Fourier transform characteristics of the height shape shown in FIG. 16A. The horizontal axis of the graph represents a spatial frequency, and the vertical axis of the graph represents a Fourier conversion value.

A solid line of this drawing indicates a Fourier conversion value (hereinafter, referred to as an ideal frequency component 170*f*) with respect to the ideal dot shape 170. A broken line of this drawing indicates a Fourier conversion value (hereinafter, referred to as a virtual frequency component 172*f*) with respect to the virtual dot shape 172.

In this case, the engraving characteristic estimation unit 162 estimates the ratio of the virtual frequency component 172*f* to the ideal frequency component 170*f*, that is, the value of each spatial frequency (virtual frequency component 172*f*/ideal frequency component 170*f*) as the engraving response characteristics.

Figure 17A:
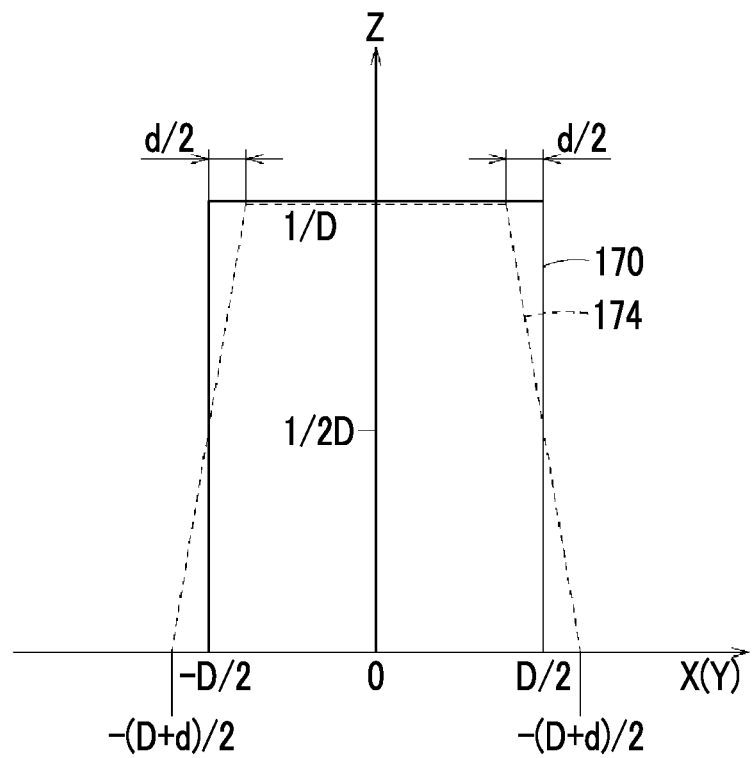
FIG. 17A is a second explanatory view relating to an estimation model of a height shape of a dot protrusion.

FIG. 17A is a second explanatory view relating to an estimation model of a height shape of a dot protrusion. The definition of the graph is the same as in FIG. 16A, and thus, description thereof will not be repeated. A solid line of this drawing indicates the ideal dot shape 170, and a broken line of this drawing indicates the virtual dot shape 174.

This estimation model is constructed on an assumption that the volume (area) of the dot protrusion is always stored, regardless of the diameter of the top portion. As will be understood from this drawing, when the diameter of the top portion becomes smaller, the inclination of the side surface becomes smaller.

Figure 17B:
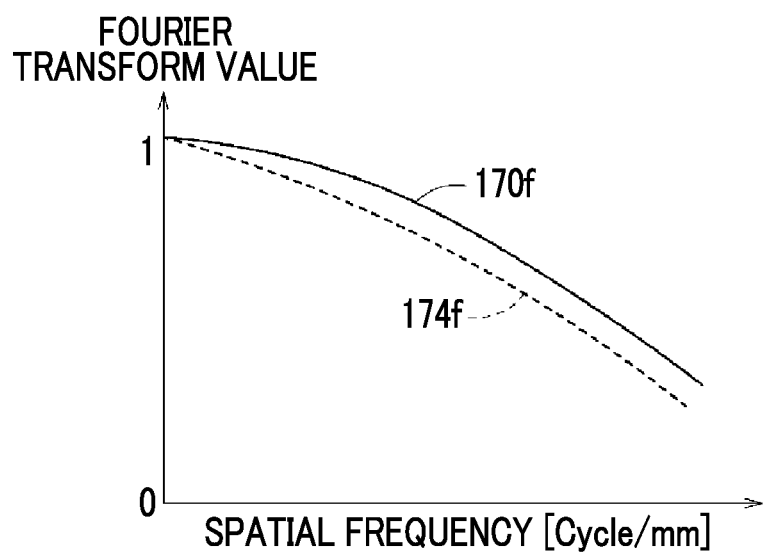
FIG. 17B is a graph showing Fourier transform characteristics of the height shape shown in FIG. 17A.

FIG. 17B is a graph showing Fourier transform characteristics of the height shape shown in FIG. 17A. The definition of the graph is the same as in FIG. 16B, and thus, description thereof will not be repeated. A solid line of this drawing indicates the ideal frequency component 170*f*, and a broken line of this drawing indicates the virtual frequency component 174*f*.

In this case, the engraving characteristic estimation unit 162 estimates the ratio of the virtual frequency component 174*f* to the ideal frequency component 170*f*, that is, the value of each spatial frequency (virtual frequency component 174*f*/ideal frequency component 170*f*) as the engraving response characteristics.

Returning to FIG. 14, the transfer characteristic estimation unit 164 estimates the transfer response characteristics based on a multiplication rule (cascaded model) of response characteristics. First, the transfer characteristic estimation unit 164 estimates the response characteristics (hereinafter, the entire response characteristics) in the entire image forming system 10 using an estimation model the same as or different from those in FIGS. 16A to 17B. Then, the transfer characteristic estimation unit 164 estimates the transfer response characteristics by separating the engraving response characteristics from the entire response characteristics.

Finally, the response characteristics estimation unit 114 supplies the estimated engraving response characteristics and transfer response characteristics to the response characteristics DB 28 side. Then, the response characteristics DB 28 associates the acquired engraving response characteristics according to the type of the plate material 12 and the letterpress forming device 22. The response characteristics DB 28 associates the acquired transfer response characteristics according to the type of the plate material 12 and the flexographic printing machine 24. In this way, the response characteristics data 112 is stored and managed in the response characteristics DB 28 in a state of being linked to the device/printing material information 52.

[Effect of the Invention]

The image processing device 20 as a threshold value data setting device is a device which sets threshold value data 44 for creating the binary image signal 46 representing the shape and arrangement of respective dots constituting an image based on the continuous tone image signal 40.

The image processing device 20 includes the threshold value candidate acquisition unit 116 which acquires the dot information 50 relating to the shape and arrangement of the respective dots linked to the continuous tone image signal 40 and acquires a plurality of pieces of threshold value data 44 conforming to the dot information 50 as the respective threshold value candidates, the response characteristics acquisition unit 118 which acquires a change in dot shape occurring in the image forming process from the creation of the binary image signal 46 to the formation of the image as response characteristics data 112 in the spatial frequency domain, the simulated image creation unit 124 which applies response characteristics data 112 to create the simulated image signal in which the change in dot shape is reproduced in a simulated manner, the quantitative value calculation unit 126 which calculates the evaluation value obtained by subjecting the simulated image signal to predetermined evaluation processing as the quantitative value indicating the degree of image quality, and the threshold value data determination unit 128 which applies the respective threshold value candidates and determines threshold value data 44 to be set from among the respective threshold value candidates by a comparison and/or evaluation based on the calculated quantitative values.

In this way, the change in dot shape occurring in the image forming process from the creation of the binary image signal 46 to the formation of the image is acquired as response characteristics data 112 in the spatial frequency domain, and response characteristics data 112 is applied to create the simulated image signal in which the change in dot shape is reproduced in a simulated manner; thus, it is possible to reproduce a dot shape on a simulated image simply and with excellent accuracy. A plurality of pieces of threshold value data 44 acquired as the respective threshold value candidates are compared and/or evaluated based on the quantitative values representing the degree of image quality; thus, even if the number of printing devices and printing materials is enormous, it is possible to simply and easily determine threshold value data 44 suitable for any combination thereof.

[Supplement]

The invention is not limited to the above-described embodiment, and can of course be changed freely without departing from the spirit of the invention.

In this embodiment, although flexographic printing has been described as an example, the image forming device is not limited to this printing system, and needless to say, can be applied to offset printing, gravure printing, a digital printing machine (on-demand printing machine), or the like.

EXPLANATION OF REFERENCES

10: image forming system
14: letterpress
16: printing medium
18: printed matter
20: image processing device
22: letterpress forming device
24: flexographic printing machine
30: print data
34: binarization processing unit
36: threshold value data setting unit
40: continuous tone image signal
44: threshold value data
50: dot information
52: device/printing material information
60: laser engraving machine
100: control unit
112: response characteristics data
114: response characteristics estimation unit
116: threshold value candidate acquisition unit
118: response characteristics acquisition unit
120: threshold value candidate evaluation unit
122: binary point creation unit
124: simulated image creation unit
126: quantitative value calculation unit
128: threshold value data determination unit
150: response characteristics estimation system
152: sample dot signal
154: sample letterpress
156: sample printed matter
158: first measuring instrument
160: second measuring instrument
170: ideal dot shape
172, 174: virtual dot shape

What is claimed is:

1. A threshold value data setting device which sets threshold value data for creating a binary image signal representing the shape and arrangement of respective pixels constituting an image based on a continuous tone image signal, the threshold value data setting device comprising:

a threshold value candidate acquisition unit which acquires dot information relating to the shape and arrangement of the respective dots linked to the continuous tone image signal and acquires a plurality of pieces of threshold value data matching the dot information as respective threshold value candidates;

a response characteristics acquisition unit which acquires a change in dot shape occurring in an image forming process from the creation of the binary image signal to the formation of the image as response characteristics in a spatial frequency domain;

a simulated image creation unit which applies the response characteristics acquired by the response characteristics acquisition unit to create a simulated image signal in which the change in dot shape is reproduced in a simulated manner;

a quantitative value calculation unit which calculates an evaluation value obtained by executing predetermined evaluation processing for the simulated image signal created by the simulated image creation unit as a quantitative value indicating the degree of image quality; and a threshold value data determination unit which applies the respective threshold value candidates acquired by the threshold value candidate acquisition unit and determines threshold value data to be set from among the respective threshold value candidates by a comparison and/or evaluation based on the quantitative values calculated by the quantitative value calculation unit.

2. The threshold value data setting device according to claim 1, wherein the simulated image creation unit creates the simulated image signal including at least one screen tint region, and the quantitative value calculation unit calculates the quantitative values based on a principal component excluding components corresponding to the respective dots for a power spectrum in the screen tint region of the simulated image signal.

3. The threshold value data setting device according to claim 2, wherein the simulated image creation unit creates the simulated image signal including two or more screen tint regions with different gradation levels, and the quantitative value calculation unit calculates the quantitative values based on statistics about the principal component in the respective screen tint regions.

4. The threshold value data setting device according to claim 1, further comprising:
a response characteristics estimation unit which estimates the response characteristics according to an event causing a change to the dot shape in the image forming process,
wherein the response characteristics acquisition unit acquires the response characteristics estimated by the response characteristics estimation unit.

5. The threshold value data setting device according to claim 2, further comprising:
a response characteristics estimation unit which estimates the response characteristics according to an event causing a change to the dot shape in the image forming process,
wherein the response characteristics acquisition unit acquires the response characteristics estimated by the response characteristics estimation unit.

6. The threshold value data setting device according to claim 3, further comprising:
a response characteristics estimation unit which estimates the response characteristics according to an event causing a change to the dot shape in the image forming process,
wherein the response characteristics acquisition unit acquires the response characteristics estimated by the response characteristics estimation unit.

7. The threshold value data setting device according to claim 4,
wherein the response characteristics estimation unit estimates the response characteristics for transferring a coloring material to a printing material through a printing plate.

8. The threshold value data setting device according to claim 5,
wherein the response characteristics estimation unit estimates the response characteristics for transferring a coloring material to a printing material through a printing plate.

9. The threshold value data setting device according to claim 6,
wherein the response characteristics estimation unit estimates the response characteristics for transferring a coloring material to a printing material through a printing plate.

10. The threshold value data setting device according to claim 7,
wherein the response characteristics estimation unit estimates the response characteristics for forming the printing plate by engraving a principal surface of a plate material.

11. The threshold value data setting device according to claim 8,
wherein the response characteristics estimation unit estimates the response characteristics for forming the printing plate by engraving a principal surface of a plate material.

12. The threshold value data setting device according to claim 9,
wherein the response characteristics estimation unit estimates the response characteristics for forming the printing plate by engraving a principal surface of a plate material.

13. The threshold value data setting device according to claim 1, further comprising:
a binarization processing unit which converts the continuous tone image signal to the binary image signal by setting the threshold value data determined by the threshold value data determination unit.

14. The threshold value data setting device according to claim 2, further comprising:
a binarization processing unit which converts the continuous tone image signal to the binary image signal by setting the threshold value data determined by the threshold value data determination unit.

15. The threshold value data setting device according to claim 3, further comprising:
a binarization processing unit which converts the continuous tone image signal to the binary image signal by setting the threshold value data determined by the threshold value data determination unit.

16. An image forming system comprising:
the threshold value data setting device according to claim 13; and
an image forming device which forms the image based on the binary image signal converted by the threshold value data setting device.

17. An image forming system comprising:
the threshold value data setting device according to claim 14; and
an image forming device which forms the image based on the binary image signal converted by the threshold value data setting device.

18. An image forming system comprising:
the threshold value data setting device according to claim 15; and
an image forming device which forms the image based on the binary image signal converted by the threshold value data setting device.

19. A threshold value data setting method using the threshold value data setting device according claim 1, which sets threshold value data for creating a binary image signal representing the shape and arrangement of respective pixels constituting an image based on a continuous tone image signal, the threshold value data setting method causing a computer to execute:
a step of acquiring dot information relating to the shape and arrangement of the respective dots linked to the continuous tone image signal and acquiring a plurality of pieces of threshold value data matching the dot information as respective threshold value candidates;
a step of acquiring a change in dot shape occurring in an image forming process from the creation of the binary image signal to the formation of the image as response characteristics in a spatial frequency domain;
a step of applying the response characteristics acquired by the response characteristics acquisition unit to create a simulated image signal in which the change in dot shape is reproduced in a simulated manner;
a step of calculating an evaluation value obtained by executing predetermined evaluation processing for the simulated image signal created by the simulated image creation unit as a quantitative value indicating the degree of image quality; and
a step of applying the respective acquired threshold value candidates and determining threshold value data to be set from among the respective threshold value candidates by a comparison and/or evaluation based on the calculated quantitative values.

20. A non-transitory computer readable medium storing a threshold value data setting program which sets threshold value data for creating a binary image signal representing the shape and arrangement of respective pixels constituting an image based on a continuous tone image signal, the threshold value data setting program causing a computer to execute the threshold value data setting method according claim 19, comprising:

- a step of acquiring dot information relating to the shape and arrangement of the respective dots linked to the continuous tone image signal and acquiring a plurality of pieces of threshold value data matching the dot information as respective threshold value candidates;
- a step of acquiring a change in dot shape occurring in an image forming process from the creation of the binary image signal to the formation of the image as response characteristics in a spatial frequency domain;
- a step of applying the response characteristics acquired by the response characteristics acquisition unit to create a simulated image signal in which the change in dot shape is reproduced in a simulated manner;
- a step of calculating an evaluation value obtained by executing predetermined evaluation processing for the simulated image signal created by the simulated image creation unit as a quantitative value indicating the degree of image quality; and
- a step of applying the respective acquired threshold value candidates and determining threshold value data to be set from among the respective threshold value candidates by a comparison and/or evaluation based on the calculated quantitative values.

* * * * *